(12) United States Patent
Kaneiwa et al.

(10) Patent No.: US 7,181,134 B2
(45) Date of Patent: Feb. 20, 2007

(54) OPTICAL ELEMENT CHANGING OPTICAL DENSITY IN RESPONSE TO ELECTROMAGNETIC WAVE

(75) Inventors: Hideki Kaneiwa, Kanagawa (JP); Ryuji Shinohara, Kanagawa (JP); Atsushi Matsunaga, Kanagawa (JP); Kiyoshi Morimoto, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 164 days.

(21) Appl. No.: 11/072,511

(22) Filed: Mar. 7, 2005

(65) Prior Publication Data

US 2005/0195284 A1 Sep. 8, 2005

(30) Foreign Application Priority Data

Mar. 5, 2004 (JP) ............................ P.2004-061851

(51) Int. Cl.
*G03B 9/02* (2006.01)
*G03B 17/02* (2006.01)
*G02F 1/15* (2006.01)

(52) U.S. Cl. ........................... 396/6; 396/506; 359/265
(58) Field of Classification Search .................... 396/6, 396/506; 359/265
See application file for complete search history.

(56) References Cited

U.S. PATENT DOCUMENTS

| | | | | |
|---|---|---|---|---|
| 5,457,564 | A * | 10/1995 | Leventis et al. ............ 359/271 |
| 5,983,057 | A * | 11/1999 | Matsuo et al. ............... 399/207 |
| 6,067,184 | A * | 5/2000 | Bonhote et al. ............ 359/265 |
| 6,336,753 | B1 * | 1/2002 | Kihira et al. ................ 396/506 |
| 6,614,577 | B1 * | 9/2003 | Yu et al. ...................... 359/265 |

FOREIGN PATENT DOCUMENTS

| | | |
|---|---|---|
| JP | 5-142700 A | 6/1993 |
| JP | 6-317815 A | 11/1994 |
| JP | 9-244072 A | 9/1997 |
| JP | 2000-506629 A | 5/2000 |
| JP | 2001-13301 A | 1/2001 |
| JP | 2003-511837 A | 3/2003 |

OTHER PUBLICATIONS

Granqvist, C.G., "Chromogenic Material for Transmittance Control of Large-Area Windows" Solid State and Material Sciences, 1990, vol. 16, Issue 5, pp. 291-308.
Cummins, David et al, "Ultrafast Electrochromic Windows Based on Redox-Chromophore Modified Nanostructured Semiconducting and Conducting Films" Journal of Physical Chemistry B, vol. 104, 2000, pp. 11449-11459.

* cited by examiner

*Primary Examiner*—W. B. Perkey
(74) *Attorney, Agent, or Firm*—Sughrue Mion, PLLC (57) ABSTRACT

An optical element comprises: an electromotive force-generating element that generates an electromotive force in response to electromagnetic wave; and an optical density-changing element that changes its optical density according to the electromotive force, the optical density-changing element comprising: at least one of metal sulfide and metal nitride; and a material that causes a change of the optical density and adsorbs to said at least one of metal sulfide and metal nitride.

27 Claims, 6 Drawing Sheets

OPTICAL ELEMENT CHANGING OPTICAL DENSITY IN RESPONSE TO ELECTROMAGNETIC WAVE

BACKGROUND OF THE INVENTION

1. Field of the Invention

The present invention relates to an optical element which changes optical density by making the use of electromotive force corresponding to the intensity of electromagnetic wave and camera unit comprising same.

2. Background of the Related Art

An element which responds to electromagnetic wave to change optical density finds a wide application. As a material capable of responding to electromagnetic wave to change optical density, i.e., control the transmission or reflection of light there may be used a photochromic material or electrochromic material.

A photochromic material changes its optical density when irradiated with light. The photochromic material is applied to sunglass, ultraviolet checker, printing-related material, processed fiber product, etc.

An electrochromic material changes its optical density upon the inflow and outflow of electron. The electrochromic material is applied to automobile anti-glare mirror, vehicle window material, etc.

One of the uses of such an optical density-changing element is a picture-taking system such as camera. For example, a film with lens has recently been widely spread as a ready-to-use camera unit requiring no loading with film because of its convenience. In order to enhance the utility of such a film with lens, development has been made to use a high sensitivity film in this camera unit. However, the related art film with lens featuring convenience was not provided with a mechanism for adjusting exposure. Therefore, when picture is taken by a film with lens comprising a high sensitivity film under bright conditions, there occur many cases where excessive exposure causes whitening of image and hence failure in picture-taking. Then, a film with lens which employs AE control system involving photometry during picture-taking to allow automatic switching of stop according to the amount of light taken has been put on the market. In this arrangement, the frequency of occurrence of failure in picture-taking due to overexposure has been drastically reduced.

As an approach for realizing such a "light adjusting filter" capable of adjusting the amount of light incident on the photographic light-sensitive material according to the amount of light taken simply at reduced cost there has been proposed a film with lens comprising the aforementioned photochromic material (see, e.g., JP-A-5-142700, JP-A-6-317815 and JP-A-2001-13301). More specifically, the photochromic material undergoes color development or shows an optical density rise when irradiated with light having a certain wavelength and undergoes discoloration or shows an optical density drop when suspended in irradiation with light, heated or irradiated with light having different wavelength. As such photochromic materials there have been known silver halide-containing inorganic compounds and some organic compounds. It has been proposed that when a filter made of a photochromic material disposed on the optical axis is allowed to undergo color development/discoloration according to the amount of incident light, light adjustment can be made.

However, it is usual that a photochromic material takes about 1 minute to undergo color development and scores of minutes or more to undergo discoloration (see, e.g., Solid State and Material Science, 1990, Vol. 16, page 291). Thus, a photochromic material can be difficultly used as a system for adjusting light taken.

On the other hand, as a material capable of undergoing faster color development/discoloration there may be used the aforementioned electrochromic material. More specifically, an electrochromic material shows an optical density rise when subjected to application of a voltage to receive or discharge electron and shows an optical density drop when electron moves in the direction opposite that of density rise. It is known that some metal oxides and organic compounds have such a nature. The combined use of such an electrochromic material, an electric source and a sensor for measuring the amount of light taken makes it possible to realize a "light adjusting filter" for adjusting the amount of light incident on a photographic light-sensitive material according to the amount of light taken.

A light adjusting system has been proposed comprising a laminate of such an electrochromic material and a solar cell which responds to light to generate electromotive force (see, e.g., JP-A-9-244072). This system, too, can be expected to perform automatic light adjustment according to the amount of light taken. However, such a laminated structure of solar cell and electrochromic material as proposed above is disadvantageous in that part of light rays transmitted by the electrochromic material layer is unavoidably absorbed by the solar cell. Therefore, this proposal is not suitable for a system requiring maximum utilization of transmitted light in a scene requiring no light adjustment such as camera-related optical element.

On the other hand, it is reported that such an electrochromic material shows an enhanced response when used adsorbed by a porous titanium oxide or antimony-doped tin oxide layer (see, e.g., JP-T-2000-506629, JP-T-2003-511837, PROCEEDINGS SPIE—The International Society for Optical Engineering XIV, 1995, Vol. 2,531, page 60 and Journal of Physical Chemistry B, 2000, Vol. 104, page 11,449).

As a light adjusting filter for picture-taking there was used an electrochromic element comprising a metal oxide as disclosed in Journal of Physical Chemistry B, 2000, Vol. 104, page 11,449. As a result, ill-balanced color and haze rise occurred, demonstrating that this electrochromic element is not of use. For this purpose, an electrochromic element having a higher light transmittance is desired. In order to use such an electrochromic element as an "automatic light adjusting filter", an electric source for driving the electrochromic element is needed. This electric source is particularly required to generate a proper electromotive force according to the amount of light taken and properly adjust the operation of the electrochromic element.

Metal oxides which have heretofore been used for this purpose leave something to be desired in light transmittance as mentioned above. It has been desired to give solution to this problem.

SUMMARY OF THE INVENTION

An aim of the invention is to provide an optical element which responds to electromagnetic wave to show a great density change in a short response time and shows little loss of transmitted light in a decolored state. Another aim of the invention is to provide an automatic transmitted light adjusting unit comprising such an optical element which can adjust light in a great amount, shows little loss of transmitted light caused by the system itself and exhibits a high response. A further aim of the invention is to provide a camera unit comprising such an automatic light adjusting unit.

The aforementioned aims of the invention can be accomplished with the following optical element and camera unit.

1. An optical element comprising: an electromotive force-generating element that generates an electromotive force in response to electromagnetic wave; and an optical density-changing element that changes its optical density according to the electromotive force, the optical density-changing element comprising: at least one of metal sulfide and metal nitride; and a material that causes a change of the optical density and adsorbs to said at least one of metal sulfide and metal nitride.

2. The optical element as defined in Clause 1, wherein the metal sulfide is zinc sulfide.

3. The optical element as defined in Clause 1, wherein the metal nitride is gallium nitride.

4. The optical element as defined in any one of Clauses 1 to 3, wherein the optical density-changing element has a metal sulfide layer and/or metal nitride layer containing the metal sulfide and/or metal nitride, respectively, and the metal sulfide layer and/or metal nitride layer has a surface roughness factor of greater than 20.

5. The optical element as defined in any one of Clauses 1 to 4, wherein the optical density-changing element has a metal oxide layer having a material adsorbed thereby which changes optical density besides the metal sulfide layer and/or metal nitride layer.

6. The optical element as defined in Clause 5, wherein the metal oxide layer has a surface roughness factor of greater than 20.

7. The optical element as defined in Clause 5 or 6, wherein the metal oxide of the metal oxide layer is tin oxide.

8. The optical element as defined in Clause 5 or 6, wherein the metal oxide of the metal oxide layer is antimony-doped tin oxide.

9. The optical element as defined in any one of Clauses 1 to 8, wherein the electromotive force-generating element and the optical density-changing element are disposed apart from each other.

10. The optical element as defined in any one of Clauses 1 to 9, wherein the electromagnetic wave is ultraviolet ray and/or visible light.

11. The optical element as defined in Clauses 1 to 10, wherein the electromotive force-generating element comprises a light-receiving element including semiconductor.

12. The optical element as defined in any one of Clauses 1 to 11, wherein the electromotive force-generating element comprises a light-receiving element including at least one of silicon, titanium oxide, zinc oxide and tin oxide.

13. The optical element as defined in any one of Clauses 1 to 12, wherein the optical density-changing element absorbs visible light in a colored state.

14. The optical element as defined in any one of Clauses 1 to 13, wherein the optical density-changing element absorbs a plurality of visible light rays having different wavelengths in a colored state.

15. The optical element as defined in any one of Clauses 1 to 14, wherein the optical density-changing element absorbs blue light, green light and red light in a colored state.

16. The optical element as defined in any one of Clauses 1 to 15, wherein the optical density-changing element has a neutral gray absorption characteristic in a colored state.

17. The optical element as defined in any one of Clauses 1 to 16, wherein the optical density-changing element exhibits an optical density of 0.2 or less, preferably 0.1 or less, more preferably 0.05 or less at a wavelength $\lambda$ of 400 nm in a decolored state.

18. The optical element as defined in any one of Clauses 1 to 17, wherein the optical density-changing element exhibits an average optical density of 0.125 or less (preferably 0.12 or less, more preferably 0.05 or less) in a wavelength $\lambda$ of from 400 nm to 500 nm, an average optical density of 0.125 or less (preferably 0.12 or less, more preferably 0.05 or less) in a wavelength $\lambda$ of from 500 nm to 600 nm, and an average optical density of 0.125 or less in (preferably 0.12 or less, more preferably 0.05 or less) a wavelength $\lambda$ of from 600 nm to 700 nm, in a decolored state.

19. The optical element as defined in any one of Clauses 1 to 18, wherein the optical density-changing element has an antireflection layer.

20. The optical element as defined in any one of Clauses 1 to 19, wherein the optical density-changing element further comprises a compound which undergoes coloring due to oxidation and/or reduction.

21. The optical element as defined in any one of Clauses 1 to 20, wherein the optical density-changing element is uniform all over the surface thereof.

22. The optical element as defined in any one of Clauses 1 to 21, wherein the optical density-changing element constitutes each of a plurality of segments, said plurality of segments constituting a display element.

23. The optical element as defined in any one of Clauses 1 to 22, wherein the optical density-changing element exhibits an optical density of 0.5 or more, preferably 0.8 or more, more preferably 0.95 or more on the average at $\lambda$ of from 400 nm to 700 nm during response to radiation of the electromagnetic wave.

24. The optical element as defined in any one of Clauses 1 to 23, wherein a response time of change of the optical density with respect to the electromagnetic wave is 5 seconds or less, preferably 2 seconds or less, more preferably 0.3 seconds or less.

25. A camera unit comprising an optical element as defined in any one of Clauses 1 to 24.

26. The camera unit as defined in Clause 25, wherein the optical density-changing element is disposed on an optical axis of a lens.

27. The camera unit as defined in Clause 26, which is a film unit with lens.

DETAILED DESCRIPTION OF THE INVENTION

The invention will be further described hereinafter.

The term "optical density" as used herein is meant to indicate the value A represented by the following equation (1):

$$A = -\log (I_T/I_0) \tag{1}$$

where $I_0$ is the intensity of light incident on the optical density-changing element; and $I_T$ is the intensity of transmitted light.

The term "surface roughness factor of metal sulfide layer (or metal nitride layer or metal oxide layer)" as used herein is meant to indicate the proportion of the true surface area of the metal sulfide layer (or metal nitride layer or metal oxide layer) in the geometric surface area thereof.

The term "in a decolored state" as used herein is meant to indicate the time during which the optical density of the optical density-changing element is kept as low as possible by shortcircuiting the both electrodes of the optical element or applying a reverse voltage across the both electrodes of the optical element, i.e., applying a voltage across the both electrodes of the optical element in the direction opposite that of the voltage applied in a colored state.

The term "electromagnetic wave" as used herein follows an ordinary definition. For example, according to "Butsurigaku Jiten (Dictionary of Physics)", Baifukan, electric field and magnetic field each contain static field which is constant with time and wavefield which varies with time and propagates to a distance in a space. This wavefield is defined as electromagnetic wave. In some detail, electromagnetic waves are classified into γ-rays, X-rays, ultraviolet light, visible light, infrared light and radio. The electromagnetic waves to which the invention applies include all these forms. The electromagnetic waves to which the invention applies particularly when the optical element of the invention is used as a light adjusting system for camera unit are preferably ultraviolet light, visible light and infrared light, more preferably ultraviolet light and visible light.

The optical element of the invention comprises an electromotive force-generating element which generates electromotive force due to electromagnetic wave and an optical density-changing element which changes optical density according to the electromotive force thus generated, wherein the change of the optical density of the optical density-changing element occurs according to the electromotive force generated by the electromotive force-generating element, i.e., electromagnetic wave incident on the electromotive force-generating element, and thus can act as a light adjusting element for changing the amount of light transmitted thereby according to the intensity of electromagnetic wave. One of the characteristics of the invention is that a metal sulfide such as zinc sulfide or metal nitride such as gallium nitride, which has a great band gap and hence a high permeability to visible light, with an electrochromic material adsorbed thereby is used in combination with a driving electric source.

The various constituents of the optical element of the invention will be described hereinafter.

The term "element for generating electromotive force (electromotive force-generating element)" as used herein is meant to indicate an element which converts electromagnetic energy to electric energy. In some detail, solar cell which converts sunlight to electric energy represents the electromotive force-generating element. The materials constituting the solar cell include monocrystalline silicon, polycrystalline silicon, amorphous silicon, cadmium telluride, and indium selenide. As a solar cell comprising these compounds there may be used one selected from known products according to the purpose of the optical element of the invention.

A technique disclosed in "Nature", vol. 353, pp. 737–740, 1991, U.S. Pat. No. 4,927,721, JP-A-2002-75443, etc. on photoelectric conversion element comprising an oxide semiconductor sensitized with a dye (hereinafter abbreviated as "dye-sensitized photoelectric conversion element") and photoelectrochemical cell comprising such a dye-sensitized photoelectric conversion element, too, can be used as electromotive force-generating element of the invention.

Preferred examples of the electromotive force-generating element of the invention include solar cells and dye-sensitized photoelectric conversion elements comprising monocrystalline silicon, polycrystalline silicon and amorphous silicon. In the case where the automatic light adjusting unit of the invention is applied to camera unit, the electromotive force-generating element preferably generates an electromotive force in proportion to the intensity of electromagnetic wave (particularly sunlight) incident thereon.

The term "element for changing optical density (optical density-changing element)" as used herein is meant to indicate an element which causes the change of optical density and hence the transmittance of electromagnetic wave according to the electromotive force, i.e., electric energy generated by the electromotive force-generating element.

Figure 1:
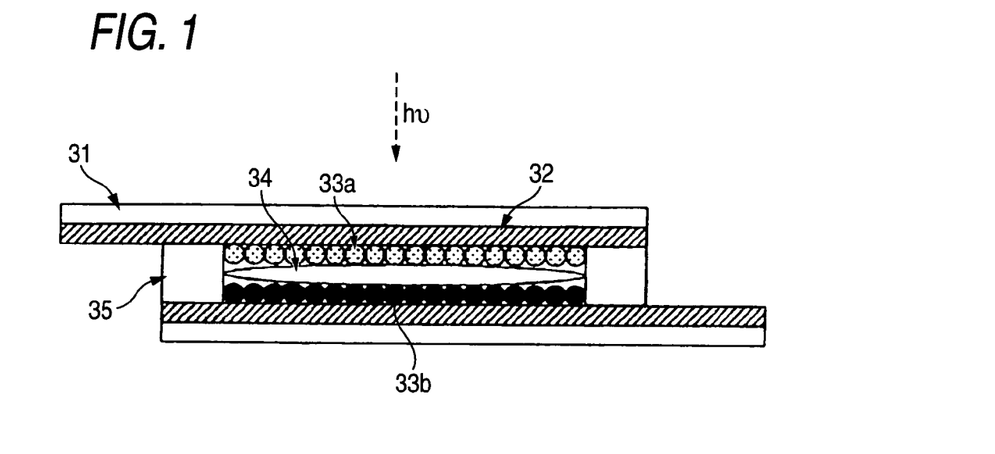
FIG. 1 illustrates a typical example of the configuration of the optical density-changing element according to the invention.

The optical density-changing element is an element containing a metal sulfide and/or metal nitride having a material (chromic material) adsorbed thereby which causes the change of optical density according to electric energy. Preferably, the optical density-changing element comprises a layer containing the aforementioned metal sulfide and/or metal nitride (metal sulfide layer and/or metal nitride layer), a support, an electrically-conductive layer for supplying electric energy into the metal sulfide layer and/or metal nitride layer, and an electrolyte taking part in the electrical conductivity in the optical density-changing element. FIG. 1 illustrates a typical example of the configuration of the optical density-changing element. In the example of FIG. 1, the chromic material is adsorbed by the former or both of a porous metal sulfide layer or metal nitride layer 33a and a porous metal sulfide layer, metal nitride layer or metal oxide layer 33b disposed opposed to the former layer 33b.

The chromic material changes in its optical density according to the electric energy supplied by the electrically-conductive layer 32 disposed thereabove and therebelow. The incident electromagnetic wave hv is absorbed by the chromic material according to the change of the optical density of the chromic material, causing the change of the amount of light transmitted by the optical element. The optical density-changing element is not limited to the form shown in FIG. 1 but may be in any form depending on the purpose. Examples of the form of the optical density-changing element include optical filter, lens, stop, mirror, window, glasses, and display panel. In the case where the invention applies to camera unit, the optical density-changing element is preferably in the form of optical filter, lens or stop.

The support constituting the optical density-changing element is not specifically limited but may be glass, plastic, polyethylene terephthalate (PET), polyethylene naphthalate (PEN), triacetyl cellulose (TAC), polycarbonate (PC), polysulfone, polyether sulfone (PES), polyether ether ketone, polyphenylene sulfide, polyarylate (PAR), polyamide, polyimide (PIM), polystyrene, norbornene resin (AR-TON), acrylic resin, methyl polymethacrylate (PMMA) or the like. The support may be properly selected depending on the purpose and form.

As such a support there is preferably selected a material which scarcely absorbs electromagnetic wave to which the optical element of the invention applies, particularly glass, PET, PEN, TAC or acrylic resin with respect to light having $\lambda$ of from 400 nm to 700 nm. In order to avoid the loss of transmitted light by reflection by the surface of the support, the support preferably has an antireflection layer (e.g., thin silicon oxide layer) provided on the surface thereof. The support may further comprise various functional layers provided on the surface thereof such as impact-absorbing layer for preventing impact against the element, rub-fast layer for preventing the damage of the element due to rubbing and electromagnetic wave-absorbing layer for cutting the electromagnetic wave falling outside the scope of the invention (e.g., ultraviolet light in the case of optical element for visible light) besides the antireflection layer.

The electrically-conductive layer constituting the optical density-changing element is not specifically limited but may be a thin metal film (e.g., gold, silver, copper, chromium, palladium, tungsten, alloy thereof), oxide semiconductor film (e.g., tin oxide, silver oxide, zinc oxide, vanadium oxide, ITO (tin oxide-doped indium oxide), antimony-doped tin oxide (ATO), FTO (fluorine-doped tin oxide), AZO (aluminum-doped zinc oxide), GZO (gallium-doped zinc oxide), thin electrically-conductive nitride film (e.g., titanium nitride, zirconium nitride, hafnium nitride), thin electrically-conductive boride ($LaB_6$), spinel type compound ($MgInO_4$, $CaGaO_4$), electrically-conductive macromolecular film (poly pyrrole/$FeCl_3$), ion conducting film (polyethylene oxide/$LiClO_4$), inorganic or organic composite film (finely divided indium oxide powder/saturated polyester resin) or the like. Among these materials, those which scarcely absorb electromagnetic wave to which the optical element of the invention applies are preferably selected. Tin oxide and ITO are particularly suitable for light having $\lambda$ of from 400 nm to 700 nm. In order to further eliminate the absorption of electromagnetic wave to which the optical element of the invention applies, the electrically-conductive layer preferably has as small thickness as possible so far as the desired electrical conductivity can be assured. In some detail, the thickness of the electrically-conductive layer is preferably 1,000 nm or less, more preferably 200 nm or less, even more preferably 100 nm or less (preferably 1 nm or more).

The metal sulfide (layer) constituting the optical density-changing element may be zinc sulfide, cadmium sulfide or composite thereof optionally doped with aluminum, gallium, indium or the like, though being not specifically limited thereto. Alternatively, other materials coated with a metal sulfide on the surface thereof may be used. Among these compounds, those which scarcely absorb electromagnetic wave to which the optical element of the invention applies are preferably selected. Zinc sulfide is preferred with respect to light having $\lambda$ of from 400 nm to 700 nm.

The metal nitride constituting the optical density-changing element may be aluminum nitride, gallium nitride, indium nitride or composite thereof, optionally doped with a small amount of foreign atoms (e.g., tin, germanium), though being not specifically limited thereto. Alternatively, other materials coated with a metal nitride on the surface thereof may be used. Among these compounds, those which scarcely absorb electromagnetic wave to which the optical element of the invention applies are preferably selected. Aluminum nitride and gallium nitride are preferred with respect to light having $\lambda$ of from 400 nm to 700 nm.

In accordance with the invention, the adsorption of a chromic material by the aforementioned metal sulfide and/or metal nitride makes it possible to realize smooth inflow of electrons into the chromic material and smooth outflow of electrons from the chromic material and hence rapid change of optical density of the optical density-changing element. In the optical density-changing element of the invention, the metal sulfide and metal nitride preferably constitute a metal sulfide layer and metal nitride layer, respectively. The more the amount of the chromic material adsorbed by the metal sulfide (layer) or metal nitride (layer) is, the more strongly can be made color development. In order that the metal sulfide (layer) or metal nitride (layer) can adsorb more chromic material, these layers are preferably rendered porous and provided with an increased surface area to have a roughness factor of 20 or more, more preferably 150 or more.

In order to render these layers porous, a method may be used which comprises attaching ultrafine particles having a size on the order of nanometers to these layers. In this case, the optimization of the size of the particles to be used or the dispersibility of size of the particles makes it possible to minimize the loss of transmitted light caused by the absorption or scattering of electromagnetic wave by the metal sulfide (layer) or metal nitride (layer). The size of the particles to be used should be preferably 100 nm or less, more preferably from not smaller than 1 nm to not greater than 60 nm, even more preferably from not smaller than 2 nm to not greater than 40 nm. The size of the particles to be used herein is preferably monodisperse.

In the invention, two or more such metal sulfide (layers) or metal nitride (layers) having a chromic material adsorbed thereby may be used. The various layers to be used herein may be made of the same or different compositions. Of course, the metal sulfide layer and the metal nitride layer may be used in combination.

In the invention, the metal sulfide (layer) or metal nitride (layer) having a chromic material adsorbed thereby may be used in a metal oxide (layer) having a chromic material adsorbed thereby. The metal oxide to be used herein is not specifically limited but may be titanium oxide, zinc oxide, silicon oxide, lead oxide, tungsten oxide, tin oxide, indium oxide, niobium oxide, cadmium oxide, bismuth oxide, aluminum oxide, ferrous oxide or composite thereof, optionally doped with fluorine, chlorine, antimony, phosphorus, arsenic, boron, aluminum, indium, gallium, silicon, germanium, titanium, zirconium, hafnium, tin or the like. Alternatively, titanium oxide coated with ITO, antimony-doped tin oxide, FTO or the like on the surface thereof may be used. Those which scarcely absorb electromagnetic wave to which the optical element of the invention applies are preferably selected. Titanium oxide, tin oxide and antimony- doped tin oxide are particularly suitable for light having λ of from 400 nm to 700 nm. Particularly preferred among these materials are tin oxide and antimony-doped tin oxide. In order that the metal oxide (layer) can absorb more chromic material, the metal oxide (layer) is preferably rendered porous and provided with an increased surface area to have a roughness factor of 20 or more, preferably 150 or more.

In the invention, the metal sulfide (layer) or metal nitride (layer) having a chromic material adsorbed thereby may be used in combination with a metal sulfide (layer), metal nitride (layer) or metal oxide (layer) having no chromic material adsorbed thereby.

Examples of the chromic material constituting the optical density-changing element include organic dyes such as viologen-based dye, phenothiazine-based dye, styryl-based dye, metalocene-based dye, anthraquinone-based dye, pyrazoline-based dye, fluorane-based dye, phthalocyanine-based dye and triarylamine, electrically-conductive polymer compounds such as polystyrene, polythiophene, polyaniline, polypyrrole, polybenzine and polyisothianaphthene, and inorganic compounds such as tungsten oxide, iridium oxide, nickel oxide, cobalt oxide, vanadium oxide, molybdenum oxide, titanium oxide, indium oxide, chromium oxide, manganese oxide, Prussian blue, indium nitride, tin nitride and zirconium nitrochloride.

The viologen-based dye is a compound represented by the structure as shown by the following general formula (1), (2), (3) or (4).

selected from the group consisting of halogen anion, $ClO_4^-$, $BF_4^-$, $PF_6^-$, $CH_3COO^-$, $CH_3(C_6H_4)SO_3^-$, etc. $R_1$ to $R_8$ each represent a hydrogen atom or $C_1$–$C_{20}$ hydrocarbon group. Examples of the hydrocarbon group include alkyl group, and aryl group. Specific examples of these hydrocarbon groups include methyl group, ethyl group, i-propoxy group, n-propyl group, n-butyl group, t-butyl group, n-pentyl group, hexyl group, cyclohexyl group, phenyl group, benzyl group, and toluil group. These hydrocarbon groups may be branched, may be substituted by any functional group such as hydroxyl group, nitrile group, amino group, nitro group, oxo group, fluoro group, chloro group and bromo group. The carbon atoms in the middle part of these hydrocarbon groups may be substituted by any hetero atom such as oxygen, nitrogen, sulfur and phosphorus. These hydrocarbon groups may be partly or entirely unsaturated. It is particularly preferred that these hydrocarbon groups have adsorptive substituents such as carboxyl group, sulfonic acid group and phosphonic acid group. $L_1$ to $L_4$ each represent a connecting group, preferably alkylene group (e.g., ethylene), alkinylene group (e.g., methine) or arylene group (e.g., phenylene). The carbon atoms in the middle part of these connecting groups may be substituted by any hetero atom such as oxygen, nitrogen, sulfur and phosphorus. These connecting groups may be partly or entirely unsaturated. Specific examples of

In these general formulae, $X_1^-$ to $X_4^-$ each represent an anion and may be the same or different. $X_1^-$ to $X_4^-$ are the viologen-based dye will be given below, but the invention is not limited thereto.

-continued

V-3

V-4

V-5

V-6

The phenothiazine-based dye is a compound represented by the structure as shown by the following general formula (5):

(5)

$R^1$ represents a hydrogen atom or $C_1$–$C_{20}$ hydrocarbon group. Examples of the hydrocarbon group include alkyl group, and aryl group. Specific examples of these hydrocarbon groups include methyl group, ethyl group, i-propyl group, n-propyl group, n-butyl group, t-butyl group, n-pentyl group, hexyl group, cyclohexyl group, phenyl group, benzyl group, and toluil group. These hydrocarbon groups may be branched, may be substituted by any functional group such as hydroxyl group, nitrile group, amino group, nitro group, oxo group, fluoro group, chloro group and bromo group. The carbon atoms in the middle part of these hydrocarbon groups may be substituted by any hetero atom such as oxygen, nitrogen, sulfur and phosphorus. These hydrocarbon groups may be partly or entirely unsaturated. It is particularly preferred that these hydrocarbon groups have adsorptive substituents such as carboxyl group, sulfonic acid group and phosphonic acid group. Specific examples of the phenothiazine-based dye include the following compounds, but the invention is not limited thereto.

P-1

P-2

The styryl-based dye is a compound having a basic skeleton as shown by the following general formula (6).

(6)

In the general formula (6), n represents an integer of from 1 to 5. This compound may have arbitrary substituents in arbitrary positions in the general formula. It is particularly preferred that this compound have adsorptive substituents such as carboxyl group, sulfonic acid group and phosphonic acid group. Specific examples of the styryl-based dye include the following compounds, but the invention is not limited thereto.

Among these chromic materials, the organic compounds can control the wavelength to be absorbed by changing its substituents. It is also desirable that the combined use of two or more chromic materials causing the change of optical density makes it possible for the optical density-changing element to change the optical density at different wavelengths.

In the case where the optical element of the invention is used as a light adjusting element for camera unit, the optical density-changing element preferably absorbs visible light, preferably a plurality of visible light rays having different wavelengths, more preferably blue light, green light and red light. It is also preferred that the optical density-changing element have substantially neutral gray absorption characteristics allowing uniform absorption of visible light. The neutral gray absorption characteristics can be realized by the combination of a plurality of materials. Preferred examples of the combination of two or more dyes include combination of viologen-based dye and phenothiazine-based dye, combination of viologen-based dye and ferrocene-based dye, combination of phthalocyanine-based dye and Prussian blue, combination of viologen-based dye and nickel oxide, combination of viologen-based dye and iridium oxide, combination of tungsten oxide and phenothiazine-based dye, combination of viologen-based dye, phenothiazine-based dye and styryl-based dye, combination of two viologen-based dyes (having different substituents) and phenothiazine-based dye, and combination of two viologen-based dyes (having different substituents) and nickel oxide.

In order to accelerate the electrochemical reaction of these chromic materials, an auxiliary compound which can under redox may exist in the optical density-changing element. The auxiliary compound may or may not change its optical density when reduced or oxidized. The auxiliary compound may exist in the metal sulfide layer or metal nitride layer similarly to the chromic material. Alternatively, the auxiliary compound may be dissolved in the electrolyte or may form a layer per se on the electrically-conductive layer.

The electrolyte constituting the optical density-changing element is composed of a solvent and a supporting electrolyte. The supporting electrolyte acts to enhance the electrical conductivity without causing any electrochemical reaction per se when charge is given or received. As the solvent there is preferably used one having polarity. Specific examples of such a polar solvent include water, alcohols such as methanol and ethanol, carboxylic acids such as acetic acid, acetonitrile, propionitrile, glutaronitrile, adiponitrile, methoxyacetonitrile, dimethylacetamide, methylpyrrolidinone, formamide, N,N-dimethylformamide, dimethylsulfoxide, dimethoxyethane, propylenecarbonate, ethylene carbonate, γ-butyrolactone, tetrahydrofurane, dioxolane, sulfolane, trimethyl phosphate, pyridine, triamide hexamethylenate, and polyethylene glycol. The supporting electrolyte acts as charge carrier in the form of ion in a solvent. The supporting electrolyte is a salt comprising ionizable anion and cation in combination. Examples of the cation include metal ions such as $Li^+$, $Na^+$, $K^+$, $Rb^+$ and $Cs^+$ and quaternary ammonium ions such as tetrabutyl ammonium ion. Examples of the anion include halogen ions such as $Cl^-$, $Br^-$, $I^-$ and $F^-$, sulfuric acid ion, nitric acid ion, perchloric acid ion, tosylate ion, tetrafluoroboric acid ion, and hexafluorophosphoric acid ion. Other examples of the electrolyte include molten salt-based electrolytes such as LiCl/KCl, solid electrolytes such as ionically-conductive material and superionically-conductive material, and solid polymer electrolytes such as membrane-like ionically-conductive material (e.g., ion-exchange membrane).

It is preferred that the optical density of the optical density-changing element of the invention at λ of 400 nm in a decolored state be predetermined to 0.2 or less, preferably 0.1 or less, more preferably 0.05 or less by properly combining the materials of the optical density-changing element, i.e., optimizing the kind of the support, electrically-conductive layer and chromic material or the kind or particle size of the metal sulfide (layer) or metal nitride (layer). Similarly, the average optical density at λ of from 400 nm to 500 nm, the average optical density at λ of from 500 nm to 600 nm and the average optical density at λ of from 600 nm to 700 nm in a decolored state are all preferably predetermined to 0.125 or less, more preferably 0.12 or less, even more preferably 0.05 or less. On the other hand, the average optical density at λ of from 400 nm to 700 nm during responce to radiation of the electromagnetic wave is preferably 0.5 or more, more preferably 0.8 or more, particularly 0.95 or more.

In the optical element of the invention, the response time of change of optical density with respect to electromagnetic wave can be predetermined to be on the order of sub-second by properly combining the materials of the optical element, particularly optimizing the kind or particle size of the metal sulfide layer or metal nitride layer as mentioned above. The term "response time of change of optical density with respect to electromagnetic wave" as used herein is meant to indicate, if electromagnetic wave is incident on the optical element, the time required until the intermediate value between the optical density (minimum optical density) before irradiation and the saturated optical density (maximum optical density) after irradiation is reached since irradiation or, if electromagnetic wave is blocked, the time required until the intermediate value between the maximum optical density and the minimum optical density is reached since blocking. In any case, a response time of preferably 5 seconds or less, more preferably 2 seconds or less, even more preferably 0.3 seconds or less can be realized in the invention.

In the optical element of the invention, the voltage to be applied to increase the optical density-changing element (cause color development) should be predetermined depending on the purpose or use of the optical element. As the applied voltage increases, color development occurs more rapidly, but it is more likely that side reactions can occur to impair the durability of the optical density-changing element. The voltage to be applied to cause color development is preferably 1 V or more, particularly from not lower than 1.5 V to not higher than 4 V.

In the optical element of the invention, the optical density-changing element and the electromotive force-generating element may be connected to each other directly or via a circuit having an amplifying, protecting or other functions. Alternatively, the circuit configuration of the optical element may be arranged such that a resistance is provided in series with the optical density-changing element to accelerate the elimination of applied voltage during blocking of light. Further, a dry battery, secondary battery or the like may be provided as an auxiliary electric source.

The optical element of the invention can be applied to window material for vehicle, display device, camera-related optical element, etc. An example of the application allowing the accomplishment of the effectiveness of the optical element of the invention is a camera-related optical element. The optical element of the invention is effective for all kinds of camera units such as camera for large and middle sizes, single-lens reflex camera, compact camera, film with lens, digital camera, broadcasting camera, movie film camera, movie digital camera and 8-mm movie camera. An example of the application allowing remarkable accomplishment of the characteristics of the optical element of the invention is a simple picture-taking system requiring no complicated control mechanism such as film with lens. Another example of the application allowing accomplishment of the characteristics of the optical element of the invention is a digital camera comprising CCD or CMOS as a pickup camera. In this arrangement, the narrow dynamic range of the pickup element can be compensated.

In the case where the optical element of the invention is applied to camera unit, the optical density-changing element is preferably disposed on the optical axis of the lens. It is preferred that the electromotive force-generating element and the optical density-changing element and the light-sensitive element of the camera (light-sensitive material (e.g., film), CCD, etc.) overlap each other as greatly as possible in light absorption characteristics (light absorption wavelength and spectral sensitivity). It is particularly preferred that the absorption wavelength of the optical density-changing element and the spectral sensitivity range of the light-sensitive element of the camera overlap each other as greatly as possible. In this arrangement, neutral gray light adjustment can be attained all over the spectral sensitivity range of the camera.

EXAMPLE

The invention will be further described hereinafter in the following examples, but the invention is not limited thereto.

Example 1

An embodiment of implementation of the optical element of the invention will be described below.

The optical element according to the present embodiment of implementation of the invention comprises in combination a light adjusting filter (1) which is an optical density-changing element and a solar cell (2) which is an electromotive force-generating element. The details and the process for the preparation of the light adjusting filter (1) and the solar cell (2) will be described hereinafter.

(1) Light Adjusting Filter (Optical Density-changing Element)

Two optical filters I and II were prepared in the following manner.

I-(i); Synthesis of Nanometric Powder of Zinc Sulfide

A nanometric powder of zinc sulfide was synthesized according to the method disclosed in JP-A-2003-73563. The composition of the powder was identified by a powder X-ray diffraction pattern. The powder was then observed under electron microscope. As a result, the average particle diameter was found to be about 40 nm.

I-(ii): Spreading of Nanometric Powder of Zinc Sulfide

To the aforementioned nanometric powder of zinc sulfide were then added a polyethylene glycol (molecular weight: 20,000), Triton X (polyoxyethylene (10) octyl phenyl ether), ethanol and water. The mixture was then uniformly stirred to prepare a coating solution. As a coating substrate there was used a transparent glass having a 0.7 mm thick antireflection film developed by sputtering an electrically-conductive $SnO_2$. The coating solution was then uniformly spread over the $SnO_2$ film of the transparent electrically-conductive glass substrate in such an amount that the spread of zinc sulfide reached 8 $g/m^2$. The glass substrate thus coated was then calcined at 45° C. for 30 minutes so that the polymer was removed to prepare a porous zinc sulfide electrode.

I-(iii): Spreading of Nanometric Tin Oxide

To a mixture of an aqueous dispersion of tin oxide having an average particle diameter of 40 nm and an aqueous dispersion of antimony-doped tin oxide having an average particle diameter of 7 nm was added a polyethylene glycol (molecular weight: 20,000). The mixture was then uniformly stirred to prepare a coating solution. As a coating substrate there was used a transparent glass having a 0.7 mm thick antireflection film developed by sputtering an electrically-conductive $SnO_2$. The coating solution was then uniformly spread over the $SnO_2$ film of the transparent electrically-conductive glass substrate. The glass substrate thus coated was then calcined at 450° C. for 30 minutes so that the polymer was removed to prepare a porous tin oxide electrode.

I-(iv): Adsorption of Chromic Dye

As chromic dyes there were used chromic dyes (V-1) and (P-1). The chromic dye (V-1) undergoes reduction at the cathode (negative electrode) to make color development. The chromic dye (P-1) undergoes oxidation at the anode (positive electrode) to make color development. In this case, the colors developed by the chromic dyes (V-1) and (P-1) differ from each other. In other words, with color development, the two chromic materials cause the change of optical density at different wavelengths. These compounds were synthesized according to the formulation disclosed in "Journal of Physical Chemistry B", 2000, Vol. 104, page 11,449.

V-1 and P-1 were dissolved in an aqueous solvent and a mixture of chloroform and methanol in a concentration of 0.02 mol/l, respectively. The porous zinc sulfide electrode prepared in I-(ii) and the porous tin oxide electrode prepared in I-(iii) were dipped in (V-1) solution and (P-1) solution, respectively, at 40° C. for 3 hours to cause chemical adsorption. The electrodes which had thus undergone chemical adsorption were each cleaned with the respective solvent, and then dried in vacuo.

The adsorption of chromic dyes to particles can be accomplished by a method which comprises mixing a chromic dye the nanometric powder during the spreading of the coating solution over the transparent electrically-conductive glass at I-(ii) so that adsorption occurs or a method which comprises mixing a chromic material with the nanometric powder prepared at I-(i) so that adsorption occurs besides the aforementioned dipping method.

I-(v): Formation to Filter Element

Figure 2:
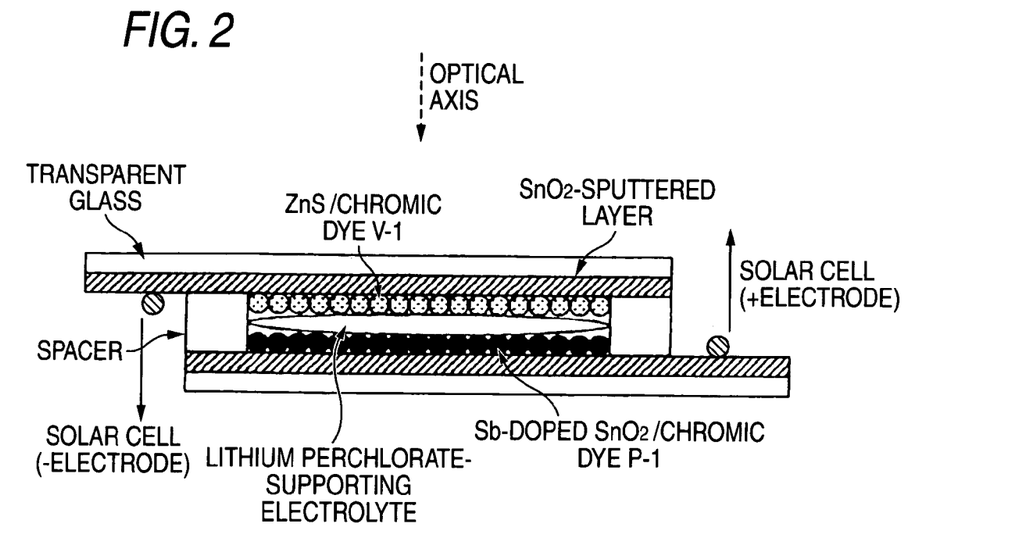
FIG. 2 is diagram illustrating an example of the optical density-changing element according to the invention (light adjusting filter)

The porous zinc sulfide electrode having the dye (V-1) adsorbed thereby and the porous tin oxide electrode having the dye (P-1) adsorbed thereby were disposed opposed to each other with a 0.2 mm thick spacer interposed therebetween as shown in FIG. 2. The gap between these components was filled with a 0.2 mol/l lithium perchlorate solution as an electrolyte to form a filter element. As each of the two sheets of electrically-conductive glass there was used a 22×22 mm slit glass substrate. A silver wire was brought into contact with the electrically-conductive layer of these electrodes. For connection to the electric source, the porous zinc sulfide electrode having the dye (V-1) adsorbed thereby was connected to the negative (−) electrode while the porous tin sulfide electrode having the dye (P-1) adsorbed thereby was connected to the positive (+) electrode. In this manner, a light adjusting filter I was obtained.

II-(i): Spreading of Nanometric Powder of Titanium Oxide

To a dispersion of a nanometric powder of titanium oxide having an average particle diameter of 40 nm were then added a polyethylene glycol (molecular weight: 20,000), Triton X (polyoxyethylene (10) octyl phenyl ether), ethanol and water. The mixture was then uniformly stirred to prepare a coating solution. As a coating substrate there was used a transparent glass having a 0.7 mm thick antireflection film developed by sputtering an electrically-conductive $SnO_2$. The coating solution was then uniformly spread over the $SnO_2$ film of the transparent electrically-conductive glass substrate in such an amount that the spread of zinc sulfide reached 8 $g/m^2$. The glass substrate thus coated was then calcined at 450° C. for 30 minutes so that the polymer was removed to prepare a porous titanium oxide electrode.

II-(ii) (spreading of nanometric powder of tin oxide), II-(iii) (adsorption of chromic dye) and II-(iv) (formation to filter element) were conducted in the same manner as in I-(iii), I-(iv) and I-(v) to obtain a light adjusting filter II.

(2) Solar Cell (Electromotive Force-generating Element)

Figure 3:
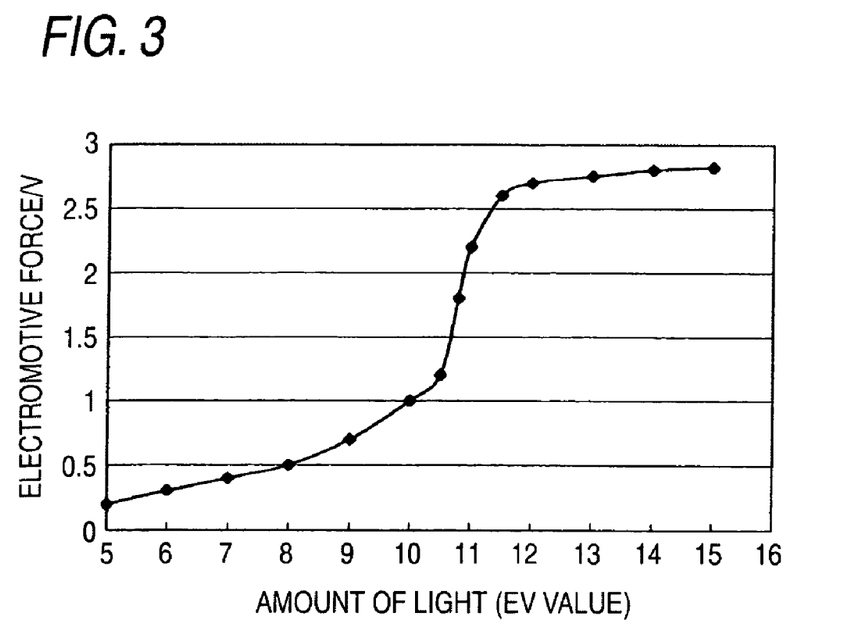
FIG. 3 is a graph illustrating the electromotive force response of the solar cell used in Example 1 to the amount of light.

As a solar cell there was used a Type SS-3012DS silicon solar cell (produced by SINONAR CO., LTD.). Unit cells of the solar cell were connected in series with each other to generate an electromotive force of about 3 V. The electromotive force characteristics of the solar cell used with respect to the amount of light emitted by a false sun (xenon lamp with a Type AM1.5 spectral filter (produced by Oriel Co., Ltd.) are shown in FIG. 3.

The light adjusting filters I and II shown in Clause (1) and the solar cell shown in Clause (2) were then used to prepare an optical element having the configuration set forth in Table 1 below.

TABLE 1

| Sample No. | Configuration |
| --- | --- |
| 101 (inventive) | Solar cell + Filter I comprising zinc sulfide |
| 102 (comparative) | Solar cell + Filter II comprising titanium oxide |

Figure 4:
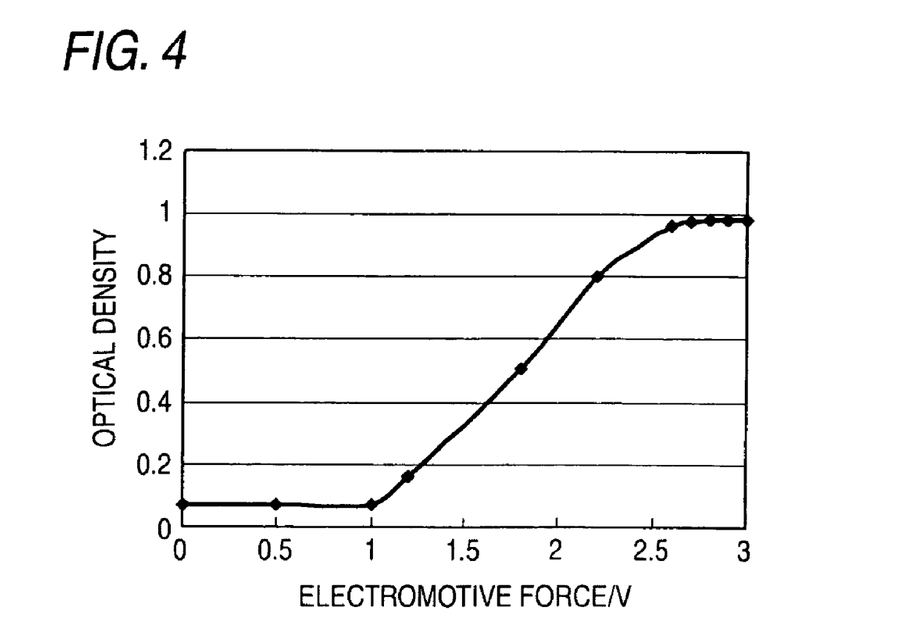
FIG. 4 is a graph illustrating the optical density response of the light adjusting filter prepared in Example 1 to electromotive force.
Figure 5:
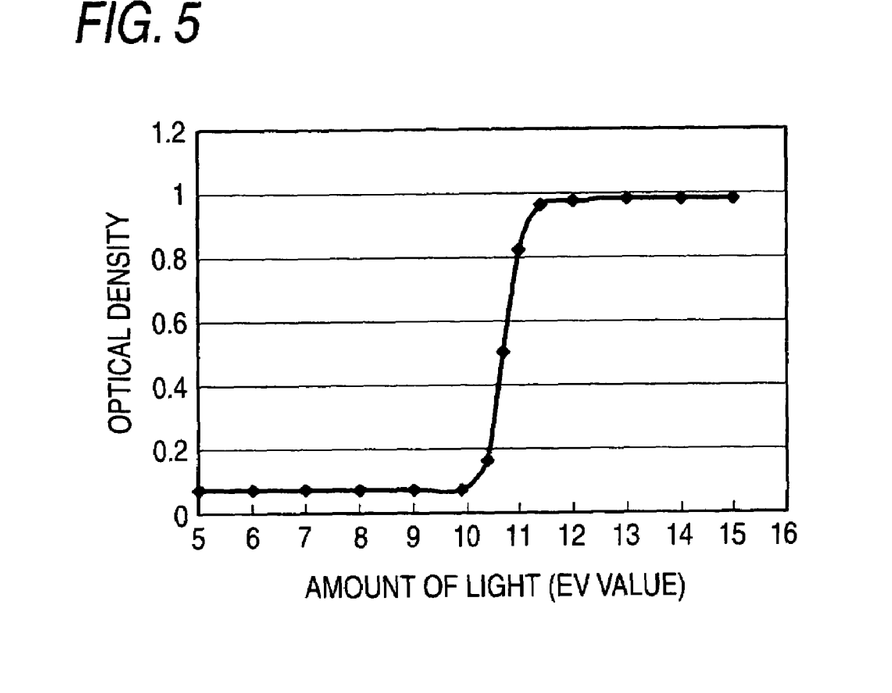
FIG. 5 is a graph illustrating the optical density response of the optical element prepared in Example 1 to the amount of light.

The optical density characteristics of the optical element used in Sample 101 with respect to the electromotive force developed by the solar cell were shown in FIG. 4. The response of the optical element comprising a solar cell and a light adjusting filter in combination to the amount of light obtained from these results is shown in FIG. 5. The optical density shown herein is at λ of 550 nm. As shown in FIG. 5, the density of Sample 101 was 0.07 when light was blocked. When Sample 101 was irradiated with light having EV of 11.0, the f stop value was raised to 0.83. When Sample 101 was irradiated with light having EV of 11.5, the f stop value was raised to 0.97. EV as used herein is a value indicating brightness and is defined from brightness L represented by the practical unit lux of illuminance as follows.

$$EV = \log_2(L/2.4) \quad (2)$$

The average optical density of the optical elements used in Samples 101 and 102 at λ of from 400 nm to 500 nm, from 500 nm to 600 nm and from 600 nm to 700 nm measured when light was blocked are set forth in Table 2 below. It is preferred that the optical density during light blocking be as low as possible.

TABLE 2

| Sample No. | Light adjusting filter | Optical density (λ = 400~500 nm) | Optical density (λ = 500~600 nm) | Optical density (λ = 600~700 nm) |
| --- | --- | --- | --- | --- |
| 101 (inventive) | Filter I comprising zinc sulfide | 0.12 | 0.07 | 0.06 |
| 102 (comparative) | Filter II comprising titanium oxide | 0.22 | 0.13 | 0.12 |

As can be seen in Table 2, the optical element sample 101 comprising the filter I comprising zinc sulfide showed a lower optical density and a better light transmittance than the optical element sample 102 comprising the filter II comprising titanium oxide.

The haze of the optical elements used in Samples 101 and 102 are set forth in Table 3. The haze as used herein indicates the proportion of non-parallel transmitted light (transmitted light which is not parallel to incident light) in the total amount of transmitted light developed by irradiating the sample with parallel light rays having a certain intensity. In the case where the optical element of the invention is used as an optical filter, when the haze of the optical element is great, the light rays transmitted by the optical element are scattered to give a blurred image. Thus, it is preferred that the haze of the optical element be as small as possible.

TABLE 3

| Sample No. | Light adjusting filter | Haze |
| --- | --- | --- |
| 101 (inventive) | Filter I comprising zinc sulfide | 1.9% |
| 102 (comparative) | Filter II comprising titanium oxide | 4.7% |

As can be seen in Table 3, Sample 101 comprising the filter I comprising zinc sulfide showed a smaller haze than Sample 102 comprising the filter II comprising titanium oxide.

Example 2

An embodiment of the optical element of the invention comprising an optical density-changing element made of a metal nitride will be described below.

The optical element according to the present embodiment of implementation of the invention comprises in combination a light adjusting filter (1) which is an optical density-changing element and a solar cell (2) which is an electromotive force-generating element. The details and the process for the preparation of the light adjusting filter (1) and the solar cell (2) will be described hereinafter.

(1) Light Adjusting Filter (Optical Density-changing Element)

(i) Synthesis of Nanometric Powder of Gallium Nitride

A nanometric powder of gallium nitride was synthesized according to the method (gas evaporation method) disclosed in JP-A-7-207260. The composition of the powder was identified by a powder X-ray diffraction pattern. The powder was then observed under electron microscope. As a result, the average particle diameter was found to be about 20 nm.

Step (ii) (spreading of nanometric powder of gallium nitride), Step (iii) (spreading of nanometric powder of tin oxide), Step (iv) (adsorption of chromic dye) and Step (iv) (formation to filter element) were conducted in the same manner as in I-(ii), I-(ii), I-(iv) and I-(v) to obtain a light adjusting filter.

(2) Solar Cell

As a solar cell there was used the same one as used in Example 1.

The optical element comprising the light adjusting filter shown in Clause (1) and the solar cell shown in Clause (2) in combination showed the same properties as that of Sample 101.

Example 3

Example 3 is an example of the optical element comprising an increased number of dyes. A light adjusting filter was prepared in the same manner as the light adjusting filter I of Example I except that 0.02 mol/l aqueous solution of V-1 to be used in I-(iv) of Example 1 was replaced by 0.02 mol/l aqueous solution of a mixture of V-1 and chromic dye V-4. When the light adjusting filter thus prepared was subjected to comparison test in the same manner as the optical element of Example 1, the inventive sample showed a light adjusting effect particularly on the suppression of red light. It is thus made obvious that the combined use of arbitrary dyes makes it possible to prepare a light adjusting element capable of exerting the desired effect.

Example 4

An embodiment of the optical element of the invention mounted on a film with lens will be described hereinafter.

Figure 6:
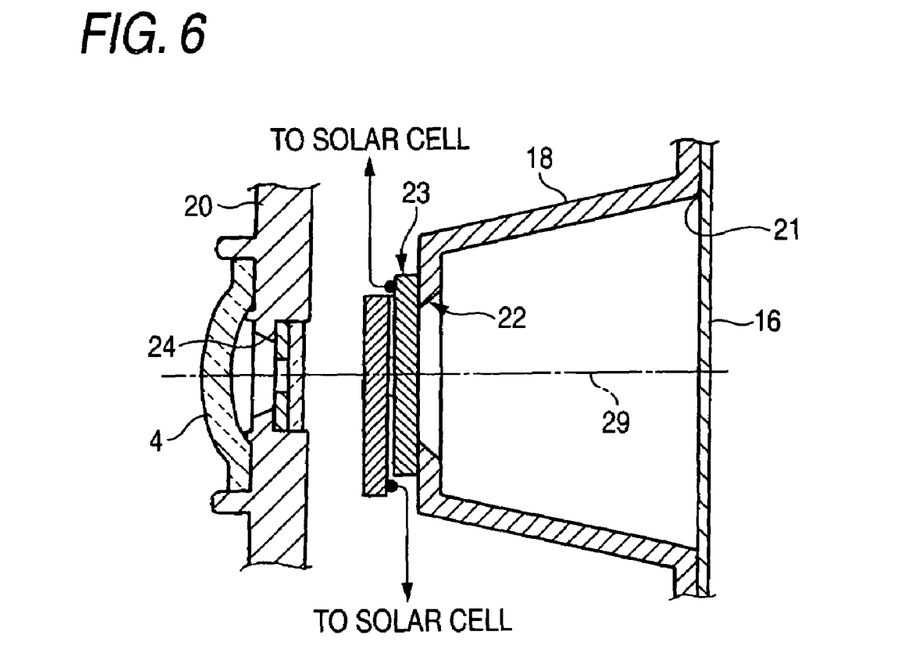
FIG. 6 is a sectional view of an essential part of a film unit with lens having an optical element according to the invention.
Figure 7:
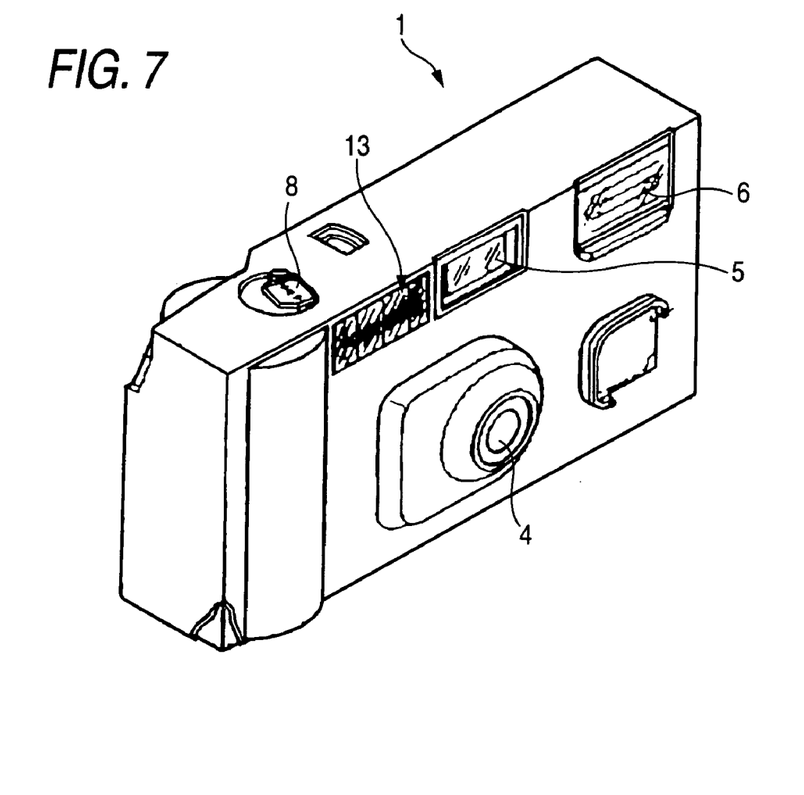
FIG. 7 is an external view of an example of a film unit with lens having an optical element according to the invention.

As shown in FIGS. 6 and 7, the film unit with lens according to the present embodiment comprises a light adjusting filter 23 (1) which is an optical density-changing element and a solar cell 13 (2) which is an electromotive force-generating element. The provision of the solar cell 13 outside the film unit causes the film unit to generate an electromotive force according to the intensity of external light. Thus, the light adjusting filter 23 can adjust the amount of light reaching the photographic film 16 according to the electromotive force to prevent overnegative image quality under high brightness conditions. The details and the process for the preparation of the light adjusting filter (1) and the solar cell (2) will be described hereinafter.

(1) Light Adjusting Filter

A light adjusting filter I comprising zinc sulfide was obtained in the same manner as in I-(i), I-(ii), I-(iii), I-(iv) and I-(v) of Example 1. A light adjusting filter II comprising titanium oxide was obtained in the same manner as in II-(i), II-(ii), II-(iii) and II-(iv) of Example 1.

(2) Solar Cell (Electromotive Force-generating Element)

As a solar cell there was used the same one as used in Example 1.

The light adjusting filters I and II shown in Clause (1) and the solar cell shown in Clause (2) were used to prepare film units with lens having the configuration as set forth in Table 4 below. The film used had ISO sensitivity of 1,600. The stop value of the film unit was F8. The shutter speed of the film unit was 1/85". In the case where the picture-taking system thus configured is used, a negative having an optimum density is obtained when picture is taken at EV of 8.4.

TABLE 4

| Sample No. | Solar cell | Light adjusting filter |
| --- | --- | --- |
| 401 (inventive) | Yes | Filter I comprising zinc sulfide |
| 402 (comparative) | Yes | Filter II comprising titanium oxide |
| 403 (comparative) | No | None |

Figure 8:
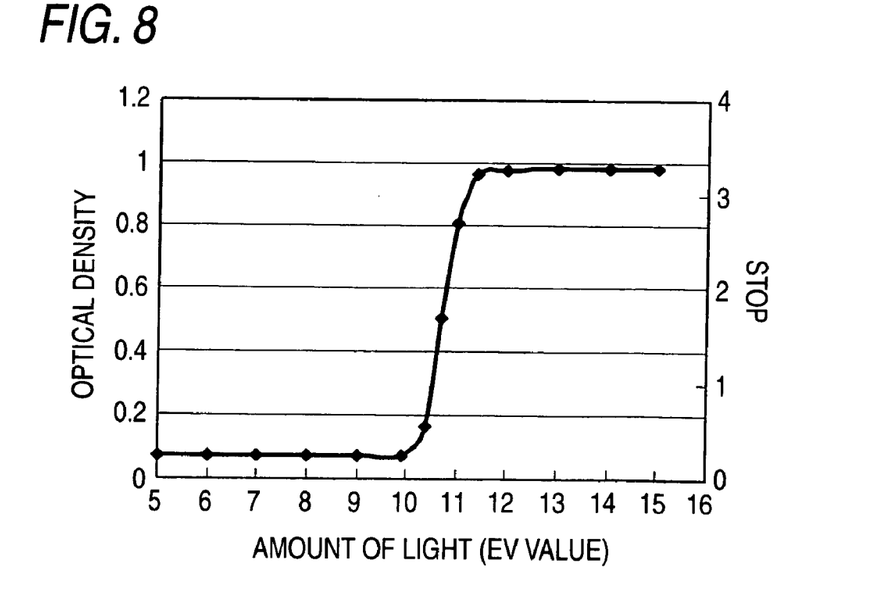
FIG. 8 is a graph illustrating the optical density response of the optical element prepared in Example 2 to the amount of light.

The optical density response of the optical element sample 401 comprising a solar cell and a light adjusting filter in combination with respect to the amount of light are shown in FIG. 8. The optical density shown herein is at λ of 550 nm. FIG. 8 also indicates the so-called "stop value" used in ordinary picture-taking system to which the optical density rise corresponds. The stop value of +1 corresponds to half the amount of transmitted light, which is an optical density increase of 0.3. As shown in FIG. 8, the stop value of Sample 401 was +0.2 when light was blocked. When Sample 401 was irradiated with light having EV of 11.0, the stop value was then raised to +2.8. When Sample 401 was irradiated with light having EV of 11.5 or more, the stop value was then raised to +3.2. The increase of the stop value of an optical element by 1 corresponds to the decrease of EV value of illuminance of light received through the optical element by 1.

The average optical density of the optical elements used in Samples 401 and 402 at λ of from 400 nm to 500 nm, from 500 nm to 600 nm and from 600 nm to 700 nm measured when light was blocked are set forth in Table 5 below. As can be seen in Table 5, as compared with the optical element sample 402 comprising the filter II comprising titanium oxide, the optical element sample 401 comprising the filter I comprising zinc sulfide exhibits a low optical density, particularly on the average at λ of from 400 nm to 500 nm, when light was blocked.

TABLE 5

| Sample No. | Light adjusting filter | Optical density (λ = 400~500 nm) | Optical density (λ = 500~600 nm) | Optical density (λ = 600~700 nm) |
|---|---|---|---|---|
| 401 (inventive) | Filter I comprising zinc sulfide | 0.12 | 0.07 | 0.06 |
| 402 (comparative) | Filter II comprising titanium oxide | 0.22 | 0.13 | 0.12 |

The haze of the optical elements used in Samples 401 and 402 are set forth in Table 6. As can be seen in Table 6, Sample 401 comprising the filter I comprising zinc sulfide showed a smaller haze than Sample 402 comprising the filter II comprising titanium oxide.

TABLE 6

| Sample No. | Light adjusting filter | Haze |
|---|---|---|
| 401 (inventive) | Filter I comprising zinc sulfide | 1.9% |
| 402 (comparative) | Filter II comprising titanium oxide | 4.7% |

Using Samples 401 to 403, picture-taking was conducted in a place having a brightness ranging from EV of 6.4 (corresponding to dark room) to EV of 15.4 (corresponding to sunshine in the summer season). Fuji Photo Film CN-16 development was then conducted for 3 minutes and 15 seconds. The comparison of the exposure level of the negatives thus obtained are set forth in Table 7. The term "exposure level" as used herein is meant to indicate the evaluation of the appropriateness of the density of the negative processed relative to that of the optimum density of negative as 0. As previously mentioned, in the case of picture-taking system used in the present embodiment, a negative having an optimum density can be obtained, that is, the exposure level is 0, when picture-taking is conducted at EV of 8.4. The exposure level of +1 means that the optical density is higher than the optimum gray density by a stop value of 1 (=0.3 higher as calculated in terms of optical density). The exposure level of −1 means that the optical density is lower than the optimum gray density by a stop value of 1 (=0.3 lower as calculated in terms of optical density).

TABLE 7

| Picture-taking conditions Sample No. | EV = 6.4 | EV = 7.4 | EV = 8.4 | EV = 9.4 | EV = 10.4 | EV = 11.4 | EV = 12.4 | EV = 13.4 | EV = 14.4 | EV = 15.4 |
|---|---|---|---|---|---|---|---|---|---|---|
| 401 (inventive) | −2.2 | −1.2 | −0.2 | +0.8 | +1.8 | +0.0 | +0.8 | +1.8 | +2.8 | +3.8 |
| 402 (comparative) | −2.4 | −1.4 | −0.4 | +0.6 | +1.6 | −0.2 | +0.6 | +1.6 | +2.6 | +3.6 |
| 403 (comparative) | −2.0 | −1.0 | 0 | +1.0 | +2.0 | +3.0 | +4.0 | +5.0 | +6.0 | +7.0 |

Supposing that printing is made with the negative thus obtained as an original, some deviation of exposure level can be corrected. In some detail, a negative having an exposure level ranging from −1 to +4 can be corrected during printing, making it possible to give a "photograph obtained as a result of successful picture-taking". When the exposure level falls outside the above defined range, complete correction cannot be made during printing, giving a "failed photograph". Table 8 indicates whether or not the photograph printed with the negatives taken under the aforementioned conditions are successful. In Table 8, the symbol S indicates success while the symbol F indicates failure.

TABLE 8

| Picture-taking conditions Sample No. | EV = 6.4 | EV = 7.4 | EV = 8.4 | EV = 9.4 | EV = 10.4 | EV = 11.4 | EV = 12.4 | EV = 13.4 | EV = 14.4 | EV = 15.4 |
|---|---|---|---|---|---|---|---|---|---|---|
| 401 (inventive) | F | F | S | S | S | S | S | S | S | S |
| 402 (comparative) | F | F | S | S | S | S | S | S | S | S |
| 403 (comparative) | F | S | S | S | S | S | S | F | F | F |

As can be seen in Table 8, Samples 401 and 402 having a light adjusting system have a broader picture-taking range than Sample 403 having no light adjusting system.

Subsequently, Samples 401 and 402 were each subjected to gray exposure at an intensity corresponding to EV of 8.4. The negatives thus obtained were each then measured for density of B layer, G layer and R layer. The measurements were then compared from unit to unit to evaluate color balance. (When the density difference between the layers of the negative thus obtained is 0.05 or less, it was judged that the color balance is acceptable.) Referring to the development conditions, Fuji Photo Film CN-16 development was conducted for 3 minutes and 15 seconds. The results are set forth in Table 9 relative to the optical density of unit previously set forth in Table 5.

TABLE 9

| Sample No. | Light adjusting filter | Optical density of filter ($\lambda$ = 400~500 nm) | Optical density of filter ($\lambda$ = 500~600 nm) | Optical density of filter ($\lambda$ = 600~700 nm) | Color balance |
|---|---|---|---|---|---|
| 401 (inventive) | Filter I comprising zinc sulfide | 0.12 | 0.07 | 0.06 | Good |
| 402 (comparative) | Filter II comprising titanium oxide | 0.22 | 0.13 | 0.12 | Poor |

As can be seen in Table 9, when picture-taking was conducted using Sample 401 comprising the light adjusting filter I comprising zinc sulfide, the color balance of the negative obtained by gray exposure was acceptable while when picture-taking was conducted using Sample 402 comprising the light adjusting filter II comprising titanium oxide, the color balance of the negative obtained by gray exposure was poor and unacceptable.

Subsequently, using Samples 401 and 402, MTF chart was photographed. The negatives thus photographed were then compared in MTF value at a spatial frequency of 10 cycles/mm. The more MTF value relative to that obtained free of filter as 100 is, the better is sharpness. The results are set forth in Table 10 relative to the haze of unit previously set forth in Table 6.

TABLE 10

| Sample No. | Light adjusting filter | % Haze | MTF value B | MTF value G | MTF value R |
|---|---|---|---|---|---|
| 401 (inventive) | Filter I comprising zinc sulfide | 1.9 | 98 | 100 | 98 |
| 402 (comparative) | Filter II comprising titanium oxide | 4.7 | 84 | 60 | 66 |

As can be seen in Table 10, the negative obtained by photographing using Sample 401 comprising the light adjusting filter I comprising zinc sulfide exhibits a higher sharpness than the negative obtained by photographing using Sample 402 comprising the light adjusting filter II comprising titanium oxide. In other words, the use of Sample 401 comprising the light adjusting filter I comprising zinc sulfide makes it possible to give a sharper photograph than the use of Sample 402 comprising the light adjusting filter II comprising titanium oxide.

Example 5

Figure 9:
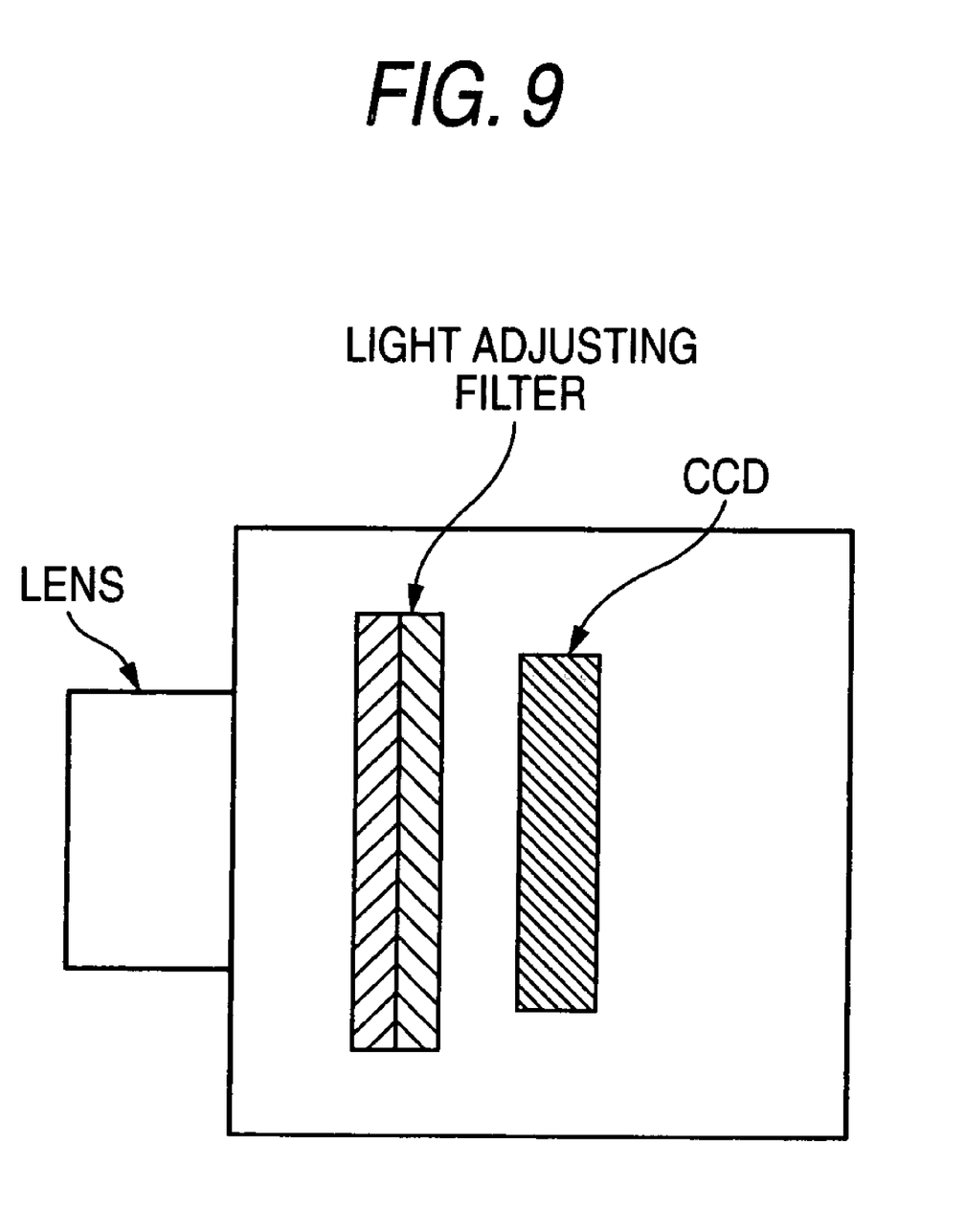
FIG. 9 is a sectional view of an essential part of an electronic still camera having an optical element according to the invention.
Figure 10:
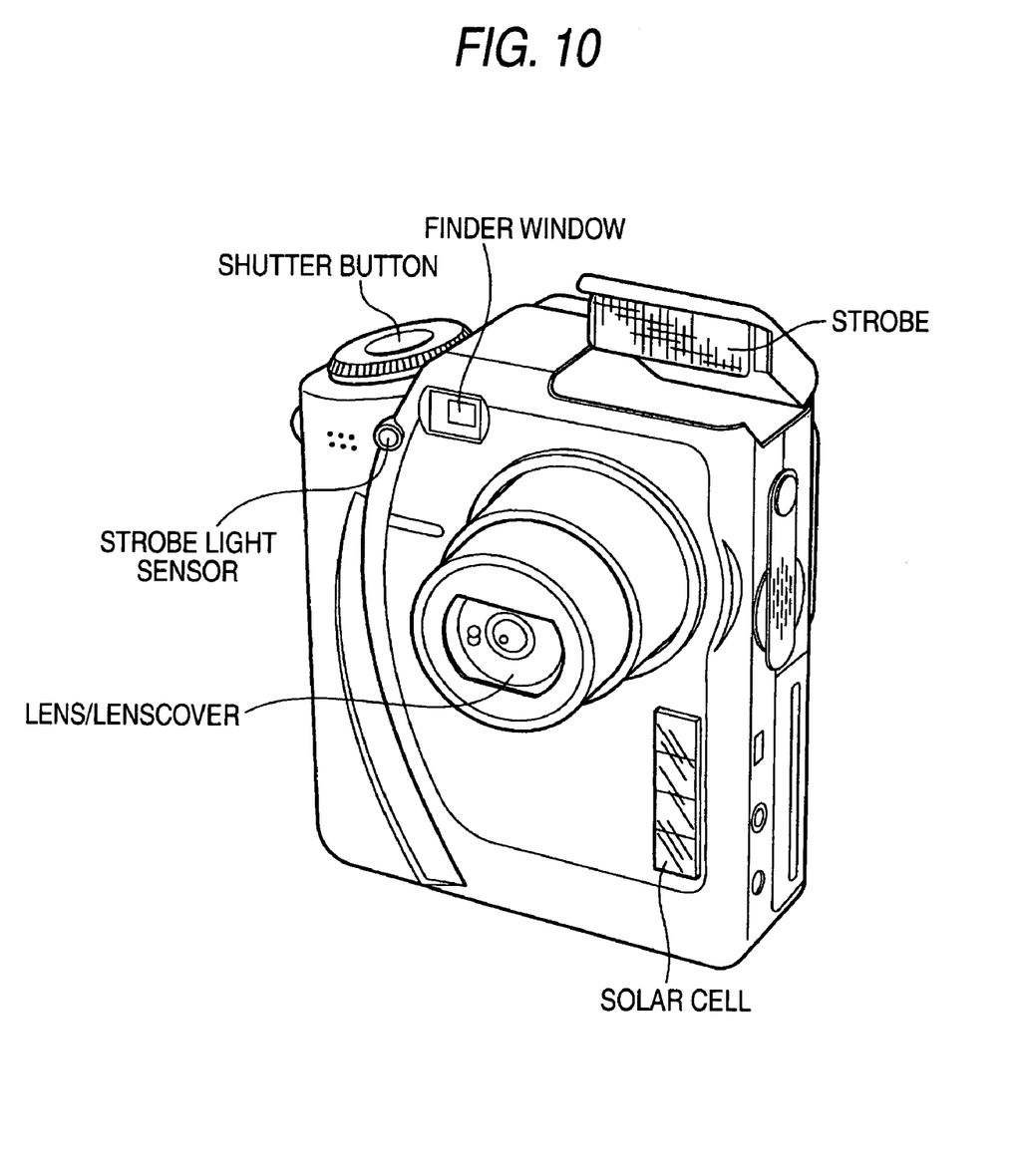
FIG. 10 is an external view of an example of an electronic still camera having an optical element according to the invention.

The present embodiment is an electronic still camera equipped with a light adjusting filter. The electronic still camera of the invention has the light adjusting filter I prepared in Step (1) of Example 4 provided interposed between the lens and CCD as shown in FIG. 9. The electronic still camera of the invention further comprises the same solar cell as used in Example 4 mounted on the exterior part thereof as shown in FIG. 10. The electronic still camera of the invention was subjected to comparative experiment in the same manner as the film unit with lens of Example 4. As a result, the inventive electronic still camera having a narrow dynamic range exerted a more remarkable light adjusting effect than the film unit with lens.

Example 6

The present embodiment is a pickup unit for cellular phone equipped with a light adjusting filter. The light adjusting filter I prepared in Step (1) of Example 4 was mounted on the lens of the pickup unit of the cellular phone. The same solar cell as used in Example 4 was provided around the pickup unit. As compared with pickup units free of the inventive optical element, the cellular phone comprising the pickup unit of the present embodiment was able to perform photographing under broad exposure conditions.

In accordance with the invention, as mentioned above, an optical element which responds to electromagnetic wave to show a great density change in a short response time, particularly an optical element comprising in combination a solar cell which responds to ultraviolet ray and visible light to generate electromotive force and an electrochromic light filter which responds to the electromotive force thus generated to show a great density change in a short response time can be obtained. By mounting the optical element on a film with lens or electronic still camera, the illuminance range within which photographing can be made can be expanded.

The entire disclosure of each and every foreign patent application from which the benefit of foreign priority has been claimed in the present application is incorporated herein by reference, as if fully set forth.

What is claimed is:

1. An optical element comprising:
    an electromotive force-generating element that generates an electromotive force in response to electromagnetic wave; and
    an optical density-changing element that changes its optical density according to the electromotive force,
        the optical density-changing element comprising:
        at least one of metal sulfide and metal nitride; and
        a material that causes a change of the optical density and adsorbs to said at least one of metal sulfide and metal nitride.

2. The optical element according to claim 1, wherein the metal sulfide is zinc sulfide.

3. The optical element according to claim 1, wherein the metal nitride is gallium nitride.

4. The optical element according to claim 1,
    wherein the optical density-changing element comprises at least one of: a metal sulfide layer containing the metal sulfide; and a metal nitride layer containing the metal nitride, and wherein said at least one of the metal sulfide layer and the metal nitride layer has a surface roughness factor of greater than 20.

5. The optical element according to claim 1, wherein the optical density-changing element further comprises a metal oxide layer including a material that causes a change of the optical density and adsorbs to the metal oxide layer.

6. The optical element according to claim 5, wherein the metal oxide layer has a surface roughness factor of greater than 20.

7. The optical element according to claim 5, wherein metal oxide of the metal oxide layer is tin oxide.

8. The optical element according to claim 5, wherein metal oxide of the metal oxide layer is antimony-doped tin oxide.

9. The optical element according to claim 1, wherein the electromotive force-generating element and the optical density-changing element are disposed apart from each other.

10. The optical element according to claim 1, wherein the electromagnetic wave is at least one of ultraviolet ray and visible light.

11. The optical element according to claim 1, wherein the electromotive force-generating element comprises a light-receiving element including semiconductor.

12. The optical element according to claim 1, wherein the electromotive force-generating element comprises a light-receiving element including at least one of silicon, titanium oxide, zinc oxide and tin oxide.

13. The optical element according to claim 1, wherein the optical density-changing element absorbs visible light in a colored state.

14. The optical element according to claim 1, wherein the optical density-changing element absorbs a plurality of visible light rays having different wavelengths in a colored state.

15. The optical element according to claim 1, wherein the optical density-changing element absorbs blue light, green light and red light in a colored state.

16. The optical element according to claim 1, wherein the optical density-changing element has a neutral gray absorption characteristic in a colored state.

17. The optical element according to claim 1, wherein the optical density-changing element exhibits an optical density of 0.2 or less at a wavelength $\lambda$ of 400 nm in a decolored state.

18. The optical element according to claim 1, wherein the optical density-changing element exhibits an average optical density of 0.125 or less in a wavelength $\lambda$ of from 400 nm to 500 nm, an average optical density of 0.125 or less in a wavelength $\lambda$ of from 500 nm to 600 nm, and an average optical density of 0.125 or less in a wavelength $\lambda$ of from 600 nm to 700 nm, in a decolored state.

19. The optical element according to claim 1, wherein the optical density-changing element has an antireflection layer.

20. The optical element according to claim 1, wherein the optical density-changing element further comprises a compound which undergoes coloring due to at least one of oxidation and reduction.

21. The optical element according to claim 1, wherein the optical density-changing element is uniform all over a surface of the optical density-changing element.

22. The optical element according to claim 1, wherein the optical density-changing element constitutes each of a plurality of segments, said plurality of segments constituting a display element.

23. The optical element according to claim 1, wherein the optical density-changing element exhibits an optical density of 0.5 or more on the average at $\lambda$ of from 400 nm to 700 nm during response to radiation of the electromagnetic wave.

24. The optical element according to claim 1, wherein a response time of change of the optical density with respect to the electromagnetic wave is 5 seconds or less.

25. A camera unit comprising an optical element according to claim 1.

26. The camera unit according to claim 25, wherein the optical density-changing element is disposed on an optical axis of a lens.

27. The camera unit according to claim 26, which is a film unit with lens.

* * * * *